US010284038B1

(12) United States Patent
Benner, Jr.

(10) Patent No.: US 10,284,038 B1
(45) Date of Patent: May 7, 2019

(54) ELECTROMECHANICAL LIMITED ROTATION ROTARY ACTUATOR AND METHOD EMPLOYING SEGMENTED COILS

(71) Applicant: Pangolin Laser Systems, Inc., Orlando, FL (US)

(72) Inventor: William R. Benner, Jr., Longwood, FL (US)

(73) Assignee: Pangolin Laser Systems, Inc., Orlando, FL (US)

( * ) Notice: Subject to any disclaimer, the term of this patent is extended or adjusted under 35 U.S.C. 154(b) by 654 days.

(21) Appl. No.: 14/632,682

(22) Filed: Feb. 26, 2015

Related U.S. Application Data

(63) Continuation-in-part of application No. 13/738,801, filed on Jan. 10, 2013, now Pat. No. 9,270,144, and a continuation-in-part of application No. 13/446,437, filed on Apr. 13, 2012, now Pat. No. 8,963,396.

(60) Provisional application No. 61/974,504, filed on Apr. 3, 2014, provisional application No. 61/585,721, filed on Jan. 12, 2012, provisional application No. 61/539,172, filed on Sep. 26, 2011.

(51) Int. Cl.
| | |
|---|---|
| *H02K 3/18* | (2006.01) |
| *H02K 33/16* | (2006.01) |
| *H02K 1/17* | (2006.01) |
| *H02K 1/14* | (2006.01) |
| *H02K 15/04* | (2006.01) |

(52) U.S. Cl.
CPC .............. *H02K 3/18* (2013.01); *H02K 1/146* (2013.01); *H02K 1/17* (2013.01); *H02K 15/0435* (2013.01); *H02K 33/16* (2013.01)

(58) Field of Classification Search
CPC ............ H02K 3/18; H02K 1/146; H02K 1/17; H02K 15/0435; H02K 33/16
USPC ................................................... 310/216.002
See application file for complete search history.

(56) References Cited

U.S. PATENT DOCUMENTS

| | | |
|---|---|---|
| 518,561 A | 4/1894 | Brown |
| 589,543 A | 9/1897 | Brown |
| 742,345 A | 10/1903 | Mygatt |

(Continued)

FOREIGN PATENT DOCUMENTS

| | | | |
|---|---|---|---|
| DE | 102009027661 A1 * | 1/2011 | ............. H02K 1/148 |
| GB | 742345 | 12/1955 | |

(Continued)

*Primary Examiner* — Alex W Mok
(74) *Attorney, Agent, or Firm* — Stephen G. Anderson; GrayRobinson, P.A.

(57) ABSTRACT

An electromechanical rotary actuator includes a stator having teeth extending inwardly from an inner wall surface, wherein free ends of each tooth form an aperture dimensioned for receiving a rotor, the free ends forming a gap therebetween. A segmented set of electrical coils extends around each tooth, wherein each coil of the segmented set has a thickness sufficient for passing through the gap between the first and second teeth. Electrically insulating tabs extend into an opening around each tooth carrying the segmented set of coils. The tabs maintain each of the coils within the segmented set in a spaced relation to the stator. When fabricating the actuator, each of the coils are fabricated and individually placed around a tooth with each coil having a thickness and breadth for optimally packing the stator.

27 Claims, 13 Drawing Sheets

(56) References Cited

U.S. PATENT DOCUMENTS

| | | | |
|---|---|---|---|
| 2,064,090 A | 12/1936 | Sullivan et al. | |
| 2,251,673 A | 8/1941 | Gillen | |
| 2,464,320 A | 3/1949 | Wijnand et al. | |
| 2,530,533 A | 11/1950 | Moody | |
| 3,109,601 A | 11/1963 | Der et al. | |
| 3,434,082 A | 3/1969 | Montagu | |
| 3,979,616 A | 9/1976 | Stechmann | |
| 3,984,714 A | 10/1976 | Grozinger et al. | |
| 4,076,998 A | 2/1978 | Montagu | |
| 4,095,130 A | 6/1978 | Oshima et al. | |
| 4,275,371 A | 6/1981 | Vogel | |
| 4,302,720 A | 11/1981 | Brill | |
| 4,319,823 A | 3/1982 | Hashimoto | |
| 4,369,385 A | 1/1983 | Malkin et al. | |
| 4,408,726 A | 10/1983 | Leonov et al. | |
| 4,491,815 A | 1/1985 | Idogaki et al. | |
| 4,506,182 A | 3/1985 | Rohdin | |
| 4,510,403 A | 4/1985 | Vanderlaan et al. | |
| 4,528,533 A | 7/1985 | Montagu | |
| 4,533,891 A | 8/1985 | Vanderlaan et al. | |
| 4,571,516 A | 2/1986 | Schneiter | |
| 4,763,034 A * | 8/1988 | Gamble | H02K 37/20 310/181 |
| 4,795,929 A | 1/1989 | Elgass et al. | |
| 4,804,934 A | 2/1989 | Finke et al. | |
| 4,817,076 A | 3/1989 | Van et al. | |
| 4,904,926 A | 2/1990 | Pasichinskyj | |
| 4,926,079 A | 5/1990 | Niemela et al. | |
| 5,029,379 A | 7/1991 | Niemela et al. | |
| 5,225,770 A | 7/1993 | Montagu | |
| 5,237,165 A | 8/1993 | Tingley | |
| 5,275,141 A | 1/1994 | Tsunoda et al. | |
| 5,337,030 A | 8/1994 | Mohler | |
| 5,369,322 A | 11/1994 | Maruyama et al. | |
| 5,424,632 A | 6/1995 | Montagu | |
| 5,465,019 A | 11/1995 | Kliman | |
| 5,583,387 A | 12/1996 | Takeuchi et al. | |
| 5,708,406 A | 1/1998 | Tsunoda et al. | |
| 5,729,071 A | 3/1998 | Steiner | |
| 5,786,651 A | 7/1998 | Suzuki | |
| 5,831,363 A | 11/1998 | Fukita et al. | |
| 5,870,010 A | 2/1999 | Ackermann | |
| 5,927,249 A | 7/1999 | Ackermann et al. | |
| 6,034,461 A | 3/2000 | Sun | |
| 6,079,833 A | 6/2000 | Kaelin et al. | |
| 6,127,753 A | 10/2000 | Yamazaki et al. | |
| 6,127,760 A * | 10/2000 | Nagasaki | H02K 1/146 310/194 |
| 6,153,952 A | 11/2000 | Ito et al. | |
| 6,243,188 B1 | 6/2001 | Stukalin et al. | |
| 6,275,319 B1 | 8/2001 | Gadhok | |
| 6,448,673 B1 | 9/2002 | Brown et al. | |
| 6,507,257 B2 | 1/2003 | Mohler | |
| 6,509,664 B2 * | 1/2003 | Shah | H02K 21/042 310/156.19 |
| 6,665,102 B2 | 12/2003 | Maruyama et al. | |
| 6,844,653 B2 | 1/2005 | Kolomeitsev et al. | |
| 6,880,229 B2 | 4/2005 | Zepp et al. | |
| 6,960,848 B2 | 11/2005 | Naganuma et al. | |
| 6,984,911 B2 | 1/2006 | Horie et al. | |
| 7,042,130 B2 | 5/2006 | Zepp et al. | |
| 7,071,800 B2 | 7/2006 | Nakanishi et al. | |
| 7,122,920 B2 | 10/2006 | Mizumaki | |
| 7,158,323 B2 | 1/2007 | Kim et al. | |
| 7,262,535 B2 | 8/2007 | Pruyn | |
| 7,385,323 B2 * | 6/2008 | Takahashi | H02K 3/38 310/194 |
| 7,414,347 B2 | 8/2008 | Wang et al. | |
| 7,471,432 B2 | 12/2008 | Pruyn | |
| 7,541,711 B2 | 6/2009 | Adaniya et al. | |
| 7,554,240 B2 | 6/2009 | Lewis et al. | |
| 7,687,948 B2 | 3/2010 | Sortore et al. | |
| 7,777,372 B2 | 8/2010 | Tanimoto et al. | |
| 7,839,041 B2 | 11/2010 | Mohler | |
| D642,265 S | 7/2011 | Hastings | |
| 8,212,448 B2 | 7/2012 | Sun et al. | |
| 8,284,470 B2 | 10/2012 | Brown et al. | |
| 8,482,243 B2 | 7/2013 | Langreck | |
| 8,674,649 B2 | 3/2014 | Langreck | |
| 2004/0051417 A1 | 3/2004 | Yamazaki et al. | |
| 2004/0155549 A1 | 8/2004 | Marioni | |
| 2004/0239200 A1 | 12/2004 | Strahan | |
| 2005/0062353 A1 * | 3/2005 | Brown | H02K 1/2726 310/156.11 |
| 2005/0093381 A1 | 5/2005 | Ionel et al. | |
| 2005/0264111 A1 | 12/2005 | Tanaka et al. | |
| 2006/0290225 A1 | 12/2006 | Mipo et al. | |
| 2007/0120436 A1 | 5/2007 | Kawasaki et al. | |
| 2007/0164615 A1 | 7/2007 | Lewis et al. | |
| 2007/0252461 A1 * | 11/2007 | Komori | B29C 45/1418 310/90 |
| 2008/0036310 A1 | 2/2008 | Marioni | |
| 2008/0054737 A1 | 3/2008 | Inayama et al. | |
| 2008/0088187 A1 | 4/2008 | Shao et al. | |
| 2008/0185932 A1 * | 8/2008 | Jajtic | H02K 1/148 310/181 |
| 2008/0252152 A1 * | 10/2008 | Gsinn | H02K 1/17 310/12.24 |
| 2009/0091198 A1 * | 4/2009 | Husband | H02K 21/44 310/46 |
| 2009/0230804 A1 | 9/2009 | Legros et al. | |
| 2009/0230808 A1 * | 9/2009 | Tatebe | H02K 3/12 310/201 |
| 2009/0261682 A1 * | 10/2009 | Fubuki | H02K 3/18 310/201 |
| 2010/0270893 A1 | 10/2010 | Bruno et al. | |
| 2011/0127872 A1 | 6/2011 | Podack | |
| 2012/0043832 A1 | 2/2012 | Neff et al. | |
| 2013/0076185 A1 | 3/2013 | Benner | |
| 2013/0076194 A1 | 3/2013 | Benner | |
| 2013/0181549 A1 | 7/2013 | Benner | |
| 2013/0200742 A1 | 8/2013 | Seki et al. | |

FOREIGN PATENT DOCUMENTS

| | | |
|---|---|---|
| JP | 2003158834 A | 5/2003 |
| JP | 4201317 B2 | 12/2008 |
| KR | 101102675 | 1/2012 |
| WO | 2009040272 A2 | 4/2009 |
| WO | 2009083898 A | 7/2009 |

* cited by examiner

ELECTROMECHANICAL LIMITED ROTATION ROTARY ACTUATOR AND METHOD EMPLOYING SEGMENTED COILS

CROSS-REFERENCE TO RELATED APPLICATIONS

This application claims the benefit of U.S. Provisional Patent Application Ser. No. 61/974,504 for Segmented Coil Stator and Associated Methods having filing date Apr. 3, 2014 and is a Continuation-in-Part of U.S. patent application Ser. No. 13/738,801 for High Torque Low Impedance Rotary Actuator and Associated Method having filing date Jan. 10, 2013, which itself claims the benefit of Application Ser. No. 61/585,721 for High Torque Low Impedance Rotary Actuator and Associated Method having filing date Jan. 12, 2012 and is a Continuation-in-Part of U.S. patent application Ser. No. 13/446,437 for Electromechanical Device and Assembly Method having filing date Apr. 13, 2012, which itself claims the benefit of U.S. Provisional Patent Application No. 61/539,172 for Electromechanical Rotary Actuator and Method having filing date Sep. 26, 2011, the disclosures of which are hereby incorporated by reference herein in their entireties and all commonly owned.

FIELD OF THE INVENTION

The present invention generally relates to electromechanical rotary actuators, and in particular to limited angle rotary actuators employing segmented coils for improved packing and thus actuator efficiency desirable for optical scanning.

BACKGROUND

Electromechanical rotary actuators are well known and are used in a variety of industrial and consumer applications. They are particularly useful in the field of optical scanning, where an optical element is attached to an actuator output shaft, which is then rotated back and forth in an oscillating manor.

Electromechanical rotary actuators are particularly useful for optical scanning, where an optical element may be attached to an actuator shaft which is rotated in an oscillating manner. In such an application, the actuator and mirror combination redirect a beam of light through a range of angles, or redirect the field of view of a camera so to observe a variety of targets. By way of further example, a prism or an optical filter may be attached to the shaft and the rotation of the actuator shaft varied. If a dielectric filter is used, changing the filter's angle-of-incidence will shift the bandpass wavelength characteristics higher or lower, thus allowing the optical system to be tuned to a particular wavelength. Alternatively, the prism or filter can be rotated completely into and out of the beam path, thus allowing selective filtering of the beam.

Typical electromechanical rotary actuators used for optical scanning are generally made from some combination of magnet, steel and coils of insulated magnet wire. These elements have been arranged in a variety of ways, but for the past twenty years, the most popular arrangement has been to use a simple two-pole rotor magnet, and a toothless stator design.

The rotor within these actuators is typically a solid, cylindrical magnet made from high grade Neodymium Iron Boron which is diametral magnetized, and onto which two shafts are attached. One shaft portion may be attached to a mirror and another shaft portion operable with a position sensor. The shaft is typically supported by ball bearings. By way of example, dimensions for this disclosure may comprise a rotor magnet having a diameter of 0.12 inches (around 3 millimeters) and a length of 1.3 inches (around 33 millimeters).

It will be helpful to review known actuator technology and make reference to known actuators to have the reader better understand the needs satisfied by embodiments of the present invention. While addressing problems in the art in this background section of the disclosure, it will also be helpful to describe developing embodiments generally accomplished through extensive analysis and experimentation. Therefore, all the disclosure included in this background section should not be construed as being a known prior art teaching.

By way of example, FIG. 1 illustrates a cross sectional view of the rotor and stator arrangement found in a typical toothless optical scanner of the current state of the art. The stator is essentially tubular. For the rotor magnet diameter described above, a typical stator tube may have an outside diameter of 0.5 inches (around 12.7 millimeters), an inside diameter of 0.196 inches (around 5 millimeters), and is typically made from cold rolled steel. Coils of magnet wire are formed and bonded to the inside wall of the stator steel tube, occupying around a 90 degree arc. There is typically around a 0.007 inch gap between the outside wall of the rotor magnet and the inside wall of the coil, thus allowing the magnet to rotate freely. Within FIG. 1, the coil areas are designated as Coil plus and Coil minus to indicate turns going into the page and turns coming out of the page, respectively.

FIG. 2 illustrates magnetic field lines found in a typical toothless optical scanner as illustrated in FIG. 1. It can be seen that the magnetic flux lines must extend, jump, across a relatively large gap to reach the stator steel. The coil resides in between the magnet and the stator steel. When the coil is energized, a Lorentz Force is imposed on both the coil and the magnet. Since the coil is typically bonded to the stator and held relatively stationary, all of the force is conveyed to the rotor magnet. Since force is created on opposite sides of the magnet, the force being in the form of torque, the actuator creates torque and thus rotary motion.

In this example of an actuator, there are 50 turns of AWG #33 magnet wire used, having a coil resistance (R) of around 2.5 ohms, and a coil inductance (L) of around 100 microhenries, producing a torque constant (KT) of around 38,000 Dyne*Centimeters torque per Amp of electrical current passing through the coil.

The toothless arrangement provides benefits. One benefit is the relatively low coil inductance that results from the fact that the coil does not completely surround a closed steel core. Quite the contrary, the entire inside of the actuator is open, containing only the rotor magnet whose permeability is almost the same as that of air.

However, the toothless structure is not without drawbacks. One primary drawback is the amount of heat generated during fast/wide angular rotor motions. Further, the heat that is generated cannot be removed effectively. Both of these drawbacks stem from the fact that, the coil occupies a relatively small space (cross-sectional area), and that it is bonded to the inside of the stator tube, so that it only has a direct attachment on one side (the outside of the coil).

Referring again to FIG. 1, it can be seen that the left, right, and inside of the coils are essentially not attached to any surfaces. Because of this, heat generated by the coil can only be removed from one surface (the outside). Indeed, heat generated at the inside surface of the coil tends to heat up the rotor magnet, which degrades performance and can risk demagnetizing the rotor magnet if the heat exceeds around 100 degrees C.

In order to generate less heat, a lower coil resistance is needed, and in order to decrease the coil resistance, thicker wire must be used.

If, for example, AWG #29 magnet wire was used instead of AWG #33 magnet wire, and was placed into the same coil area, only around 22 turns could be used, providing a coil resistance (R) of 0.48 ohms and a torque constant (KT) of 16,720 Dyne*Centimeters per amp. The coil resistance is certainly lower (because of the thicker wire), but the torque constant is also lower (because there are fewer turns).

When comparing motor designs, it is useful to use figures of merit. One important figure of merit is referred to as a motor constant (KM), which indicates the amount of heat generated for a given amount of torque produced by the actuator. The KM can be calculated several ways, but the easiest way is: KM=KT/√R.

The KM of the original actuator with 50 turns, whose KT=38,000 and R=2.5 ohms is 24,033 Dyne*Centimeters per square root of watt. Therefore, to generate 24,033 Dyne*Centimeters of torque, the motor will need to dissipate 1 watt of heat. To generate twice this amount of torque, or 48,066 Dyne*Centimeters, the motor will need to dissipate 4 watts of heat. Doubling the torque output requires doubling the electrical current input. Since heat is proportional to current squared, it illustrates that doubling the current creates four times the heat.

Comparing these values to the same actuator with 22 turns of AWG #29, whose KT=16,720 and R=0.48, reveals that the KM is now 24,133 or, roughly the same as it was before.

This demonstrates an important law of moving magnet actuators. The KM is dictated by the area allocated for the coil. It does not matter how many turns of wire occupy the coil area. If the coil area remains the same and is fully filled with turns, then the KM will remain the same.

For this reason, it is tempting to simply increase the coil area, for example, by increasing the outside diameter of the coil (and inside diameter of the stator tube). However, increasing the diameter of the stator tube will increase the magnetic air-gap, across which the magnetic flux must jump.

Another figure of merit used in magnetic design is referred to as a Permeance Coefficient (PC). The PC indicates an operating point of the rotor magnet. For a simple circuit including a magnet, air, and high permeability steel, the PC may be determined by dividing Magnetic Length by a total magnetic air-gap. For the electromechanical actuator described above with reference to FIG. 1, having a rotor diameter (magnetic length) of 0.120 and stator inside diameter of 0.196 inches, the magnetic air-gap is 0.196−0.120=0.076 inches. Therefore the PC is approximately 0.120/0.076=1.6.

By way of example and with reference to FIG. 3, B/H curve of a typical high performance Neodymium Iron Boron Magnet is illustrated. The X axis represents coercivity (H) of the magnet. The Y axis represents the flux density (B). The numbers around the outside (starting at 0.1 and ending at 5.0 on this plot) are PC values, which dictate the operating point of the magnet. This plot illustrates that at a PC of 1.6 (as is the case for a typical actuator used in the current state of the art), the magnet operates at a flux density of 8.7 kilogauss when the temperature is 20 degrees C.

If the inside diameter of the stator tube is increased to 0.24 inches, by way of example, this will provide more than double the area for coil wires, easily allowing more than 22 turns of AWG #29 magnet wire to be used. However, increasing the inside diameter of the stator tube also increases the magnetic air-gap that the magnetic flux must jump across. Because of this, the magnetic field becomes weaker. This is shown in the plot of FIG. 4, indicated by the PC of 1.0. The weaker magnetic field requires even more coil turns to produce the same torque constant. The lower PC also creates a risk of demagnetization at elevated temperatures.

Analysis and testing have shown that the KM of a toothless actuator remains roughly the same between a PC of 1.0 and 2.0, and thus, there is essentially no well-known way to overcome the problem of heat generation within a toothless actuator. Therefore, if heat generation is a performance limiting factor, another type of actuator must be sought.

In the past, some companies have tried to overcome the problem of heat generation by using toothed actuators, also referred to as slotted actuators. By way of example, FIG. 5 illustrates a cross sectional view of one such actuator used in known optical scanners. In a toothed actuator, the coil is not located between the magnet and the stator steel, and instead is wound around a steel core which forms teeth around the magnet. Since the coil is no longer located between the magnet and the stator steel, the stator teeth can be much closer to the magnet. As a result, the PC of toothed actuators is much higher than for toothless actuators.

FIG. 6 illustrates the same magnet B/H curves as illustrated in FIGS. 3 and 4, but also highlights resulting flux density when the PC is 6. Since the magnet is operating at a higher flux density, only 38 turns of wire is required to generate 38,000 Dyne*Centimeters per amp, given the same rotor magnet described above. And since the coil area is much greater, thicker wire can be used.

Clearly a toothed stator arrangement can solve the heat generation problem. However, a new problem emerges which is one of greatly increased electrical inductance (L). For the actuator illustrated with reference to FIG. 5, by way of example, the inductance is greater than 300 microhenries, which is about three times the inductance of a toothless actuator with the same torque constant.

Referring again to FIG. 6 and now to FIG. 7, inductance is increased because of two factors. The first factor is external fringe lines which circulate magnetic flux around the coil, but do not interact with the rotor magnet to create torque. A second factor is tooth-to-tooth fringe lines which circulate magnetic flux around a gap between teeth and do not create torque.

To eliminate external fringe lines, the toothed stator could be rearranged, as illustrated with reference to FIG. 8, wherein the coils are wound around the teeth that are located completely contained inside the stator, essentially forming a series magnetic circuit between the two coils. Indeed this does help to reduce inductance to about 212 microhenries, but still undesirably more than double that of a toothless actuator producing the same torque.

To reduce the inductance even further, the tooth-to-tooth fringe must be reduced, and thus the gap between stator teeth must be opened up. For example, if the gap between stator teeth is increased to 0.050 inches, the inductance becomes 180 microhenries. If the gap between stator teeth is increased even further—to 0.070 inches, the inductance becomes 157 microhenries. This is still more than 50% higher than a slotless actuator, but may be tolerable for certain applications.

However, increasing the gap between stator teeth has negative consequences. The largest being that the actuator will tend to cog toward angles away from the center, since the North and South poles of the rotor magnet will strongly orient themselves in the direction of the stator teeth themselves. A small amount of cogging can be tolerated by a servo system located outside the optical scanner, but a large amount of cogging is detrimental to performance and thus, highly undesirable.

For example, with the toothed or slotted actuator described above with reference to FIG. 8, whose gap between teeth is 0.030 inches, the cogging torque is 14,000 Dyne*Centimeters at 20 degrees. When the gap between teeth is increased to 0.036 inches, the cogging torque is 22,000 Dyne*Centimeters at 20 degrees. When the gap between teeth is increased to 0.050 inches, the cogging torque increases to 40,000 Dyne*Centimeters at 20 degrees. When the gap between teeth is increased to 0.070 inches, the cogging torque increases to 85,000 Dyne*Centimeters at 20 degrees. A cogging torque of 14,000 Dyne*Centimeters is tolerable, but higher cogging torques are generally not tolerable.

Since limiting the inductance in a toothed actuator also means increasing the cogging torque, it would be expected that a toothed actuator should therefore not be used if inductance is a performance-limiting factor.

Further, as with electric motors and actuators that have teeth, normally each tooth, some made from laminations, is generally solid and each coil is typically wound on a fully assembled stator. As is appreciated in the art, winding a coil on such a stator is difficult and expensive, since the wire must first exist externally, and must be placed on each tooth turn-by-turn. This is difficult because of the close proximity between actuator teeth. In addition, it is also difficult to achieve optimal coil wire (typically copper) packing using such an approach. Such typical coil winding approaches are known to be expensive, and often result in a sub-optimal performance for the motor or actuator.

By way of example, one approach to improving coil packing is presented in US Patent Application Publication US 2013/0076185 for an Electromechanical limited Rotation Rotary Actuator by William R. Benner, Jr. For this Benner publication, the stator is segmented into multiple segments. In one embodiment, the actuator includes two stator sections, each fabricated from a plurality of laminated layers. The stator structure has discrete laminations employing a point-and-socket approach that allows the stator to be assembled as stator sections. Because of this, the coils extending around each tooth can be placed on each stator section very easily, since there is no other tooth to get in the way. Further, the coils can be wound directly onto a stator section by machine or alternatively, the coils can be separately wound onto a bobbin, or formed using bondable magnet wire, and then simply slid onto each of the teeth of each stator section. Once the coils are in place, the stator sections can be slid together. This construction provides a very inexpensive and easy way to assemble the stator assembly, and also allows for maximum conductor packing and thus a desirable actuator performance. While there are benefits to the use of segmented stators, there are drawbacks. By way of example, a segmented stator typically requires many more laminations that must be stacked. In the case of the segmented actuator as earlier referenced, there are two stacks of laminations with each stack having forty four separate pieces of metal layers, for a total of eighty eight laminations. If the stator were not segmented, there would only be forty four layers of metal forming the laminated stator. By way of further example for a stator having three teeth, there would need to be three times the number of laminations. It means that a human or a machine must stack many more layers to assemble the stator.

It is well known that motor and coil manufacturers are typically trying to obtain the highest flux, maximum lines of magnetic force, for a given amount of stator metal and magnetism. The more flux created, the more torque becomes available.

To reiterate, the typical toothless actuator is generally not capable of delivering a high torque constant along with a low coil resistance, and a typical toothed actuator is generally not capable of delivering low coil inductance. Further, typical actuators are generally more expensive to build, either because of increased costs of placing turns of wire on the teeth, or because of the increased cost of additional laminations needed in a segmented stator. Thus, there is clearly a need for an electromechanical rotary actuator that provides a high torque constant and a low coil resistance along with a low coil inductance. Further, there remains a need for a stator having a highly packed coil density for providing an efficiently operating actuator. Yet further, there is a need to provide such high density packing in an economical manner.

SUMMARY

In keeping with the teachings of the present invention, an electromechanical rotary actuator may comprise a stator having first and second teeth extending inwardly from an inner wall surface thereof, wherein free ends of each tooth form an aperture dimensioned for receiving a rotor therein, and wherein the free end the first tooth is in spaced relation to the free end of the second tooth to form a gap therebetween; and a segmented set of electrical coils extending around each tooth, wherein each coil of the segmented set has a thickness sufficient for passing through the gap between the first and second teeth. Electrically insulating tabs may extend into an opening around each tooth, wherein the opening carries the segmented set of coils, and wherein the tabs maintain each of the coils within the segmented set in a spaced relation to the stator.

A method aspect of the invention may comprise providing a stator having first and second teeth extending inwardly from an inner wall surface thereof, wherein free ends of each tooth form an aperture dimensioned for receiving a rotor therein, and wherein the free end the first tooth is in spaced relation to the free end of the second tooth to form a gap therebetween. Forming a first coil having an opening therein for extending around each tooth, wherein the coil has a first thickness sufficient for passing through the gap and passing the first coil through the gap and positioning the first coil around one tooth. Forming a second coil having the opening therein for extending around each tooth, wherein the second coil has a second thickness sufficient for passing through the gap and passing the second coil through the gap and positioning the second coil around the one tooth. Repeating the forming and passing steps for providing a segmented set of electrical coils extending around each tooth in an optimal packing of the stator. Further, electrically insulating tabs may be positioned for extending into an opening around each tooth for maintaining each of the coils within the segmented set in a spaced relation to the stator.

BRIEF DESCRIPTION OF DRAWINGS

For a fuller understanding of the invention, reference is made to the following detailed description, taken in connection with the accompanying drawings illustrating various embodiments of the present invention, in which.

DETAILED DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 9:
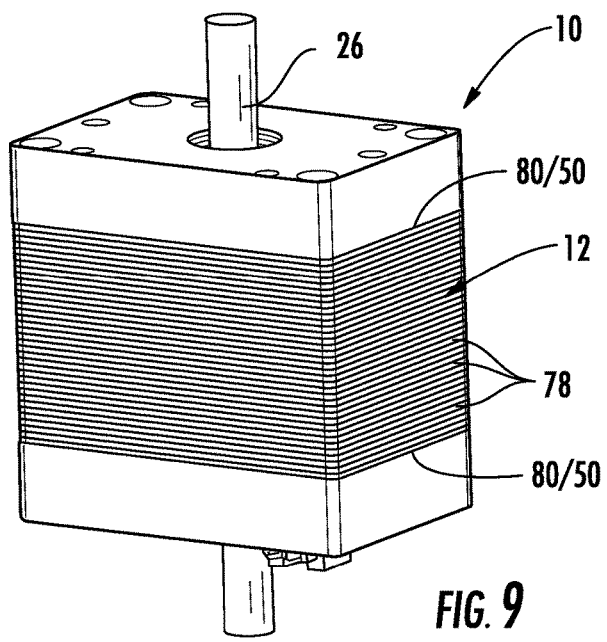
FIG. 9 is a perspective view of one electromechanical actuator according to the teachings of the present invention.
Figure 10:
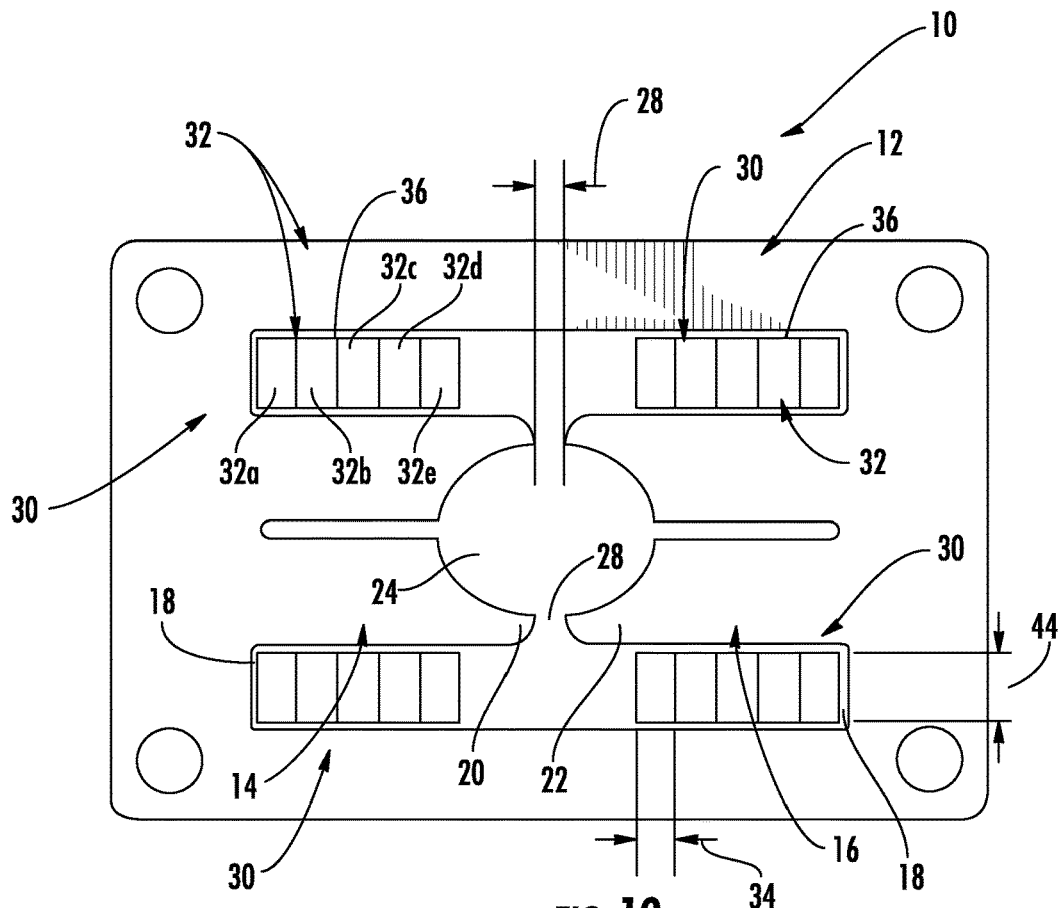
FIG. 10 is a top plan cross sectional view of a stator portion in FIG. 1.

Referring initially to FIGS. 9 and 10 with regard to the teachings of the present invention, one electromechanical rotary actuator 10 is herein described by way of non-limiting example as including a stator 12 having first and second teeth 14, 16 extending inwardly from an inner wall surface 18. Free ends 20, 22 of each tooth 14, 16 form an aperture 24 dimensioned for receiving a rotor 26. Further, the free end 20 the first tooth 14 is in spaced relation to the free end 22 of the second tooth 16 so as to form a gap 28 between the free ends.

Figure 11:
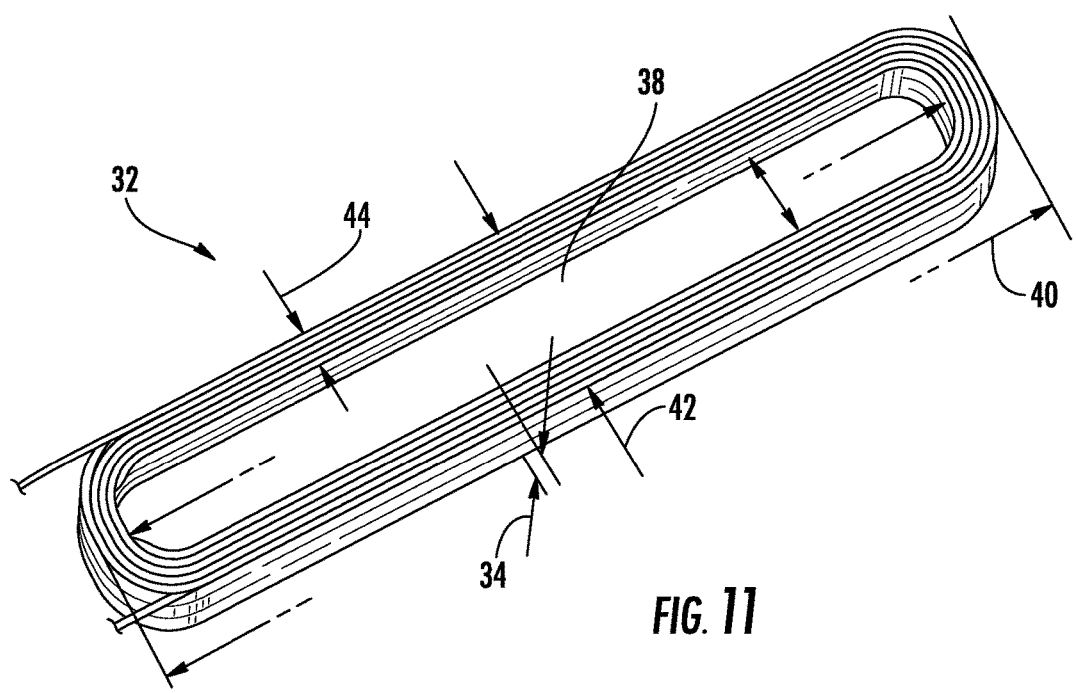
FIG. 11 is a perspective view of a rectangular toroidal shaped electrical coil form from copper wire.

With continued reference to FIG. 10 and now to FIG. 11, a coil 32 may be used to form a segmented set 30 of electrical coils 32a, 32b, 32c, 32d and 32e, by way of example, for extending around each tooth 14, 16, wherein each coil 32 of the segmented set 30 has a thickness 34 sufficient for passing through the gap 28 between the first and second teeth 14, 16. While a generally rectangular shaped toroidal electrical coil is herein described by way of example, those of skill in the art will appreciate that the teachings of the present invention are not limited to such coil shapes.

Figure 12:
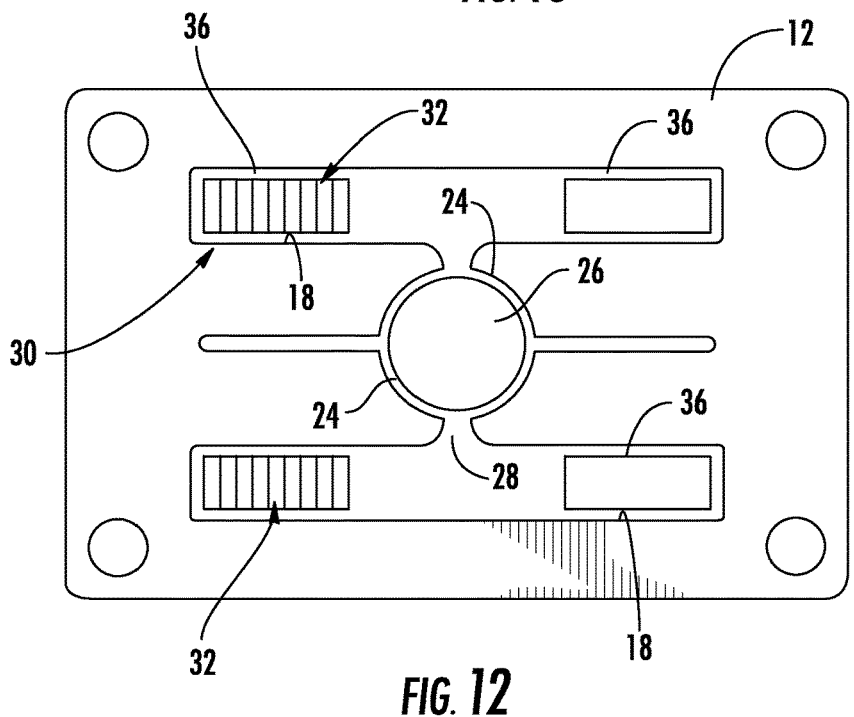
FIG. 12 is a top plan cross sectional view in an alternate embodiment of the stator of FIG. 1.

As illustrated with reference to FIG. 12, it will come to the mind of those skilled in the art that any number of coils 32 may be used, each limited to a thickness 34 for fitting through the gap 28 and thus for optimally packing a coil area 36 between the teeth 14, 16 and the stator inner wall surface 18. With reference again to FIG. 11, the coil 32 may be defined as having a coil opening 38 to surround the tooth 14, 16 to which it is assigned, a coil length 40, coil breadth 42, and coil width 44 to be positioned within the coil area 36.

By way of example, and with reference to the disclosure in related U.S. patent application Ser. No. 13/738,801 for High Torque Low Impedance Rotary Actuator and Associated Method, the disclosure of which is herein incorporated by reference in its entirety, reference is now made to FIG. 13, one embodiment of the rotary actuator 10 is described as actuator 100, and maintaining the reference numerals for convenience, comprising a stator 102 having an aperture 104 extending axially therein and two teeth 106, 108 having contoured ends 110, 112 forming portions of the aperture. Distal ends 114, 116 of the teeth 106, 108 are in a spaced relationship and form a gap 118, as disclosed earlier as the gap 28 in FIG. 10. A rotor 120 includes a two-pole diametral magnet 122 bidirectionally operable with the stator 102 and extending into the aperture 104. A separation 124, herein an air-gap, is formed between an outer surface 126 of the magnet 122 and the contoured ends 110, 112 of the teeth 106, 108. For the embodiment described by way of non-limiting example in application Ser. No. 13/738,801, two electrical coils 128, 130 each respectively extending around a portion of each tooth 106, 108. The electrical coils 128, 130 are excitable for providing bidirectional torque to the rotor 120.

In keeping with the teachings of the present invention, and to more fully pack coil areas 36, as earlier described with reference to FIG. 10, additional coils 128a, 128b and 130a, 130b, having an appropriate thickness to fit through the gap 118 are placed around respective teeth 106, 108. The coils 128, 128a and 128b, as well as 130, 130a and 130b, are then each wired to perform as single coils 128, 130 around their respective teeth, as desired.

Figure 13:
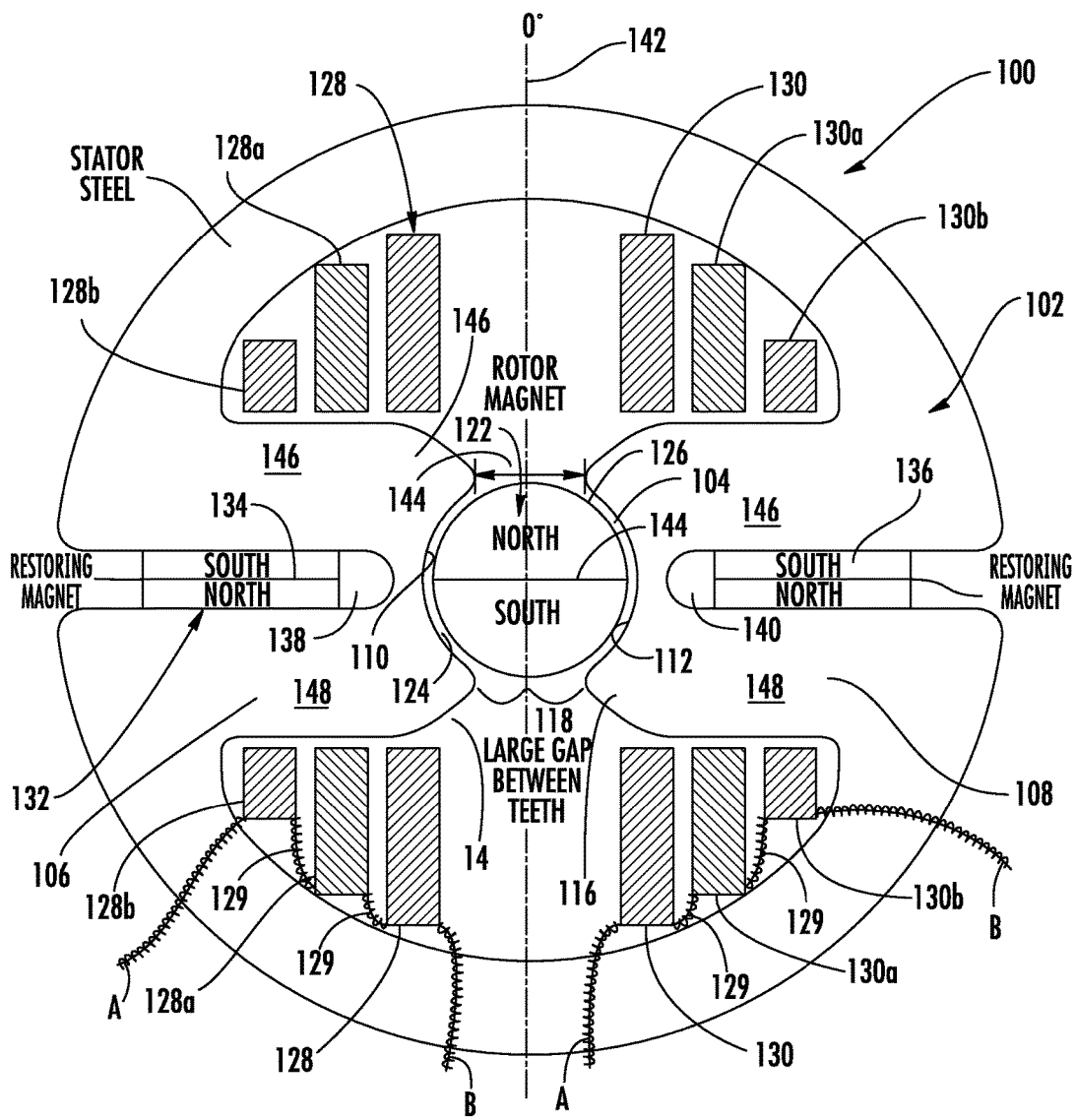
FIG. 13 illustrates one embodiment of the present invention, wherein a two-tooth actuator with restoring magnets is illustrated by way of example.

With continued reference to FIG. 13, rotor restoring means 132 in the form of restoring magnets 134, 136 are carried within slots 138, 140 in each tooth 106, 108 longitudinally extending toward the aperture 104. The rotor restoring means 132 may comprise only one restoring magnet. The rotor restoring means 132 is positioned for restoring the rotor 120 to a central rotation angle 142 when current is withheld from the electrical coils 128, 130. For the embodiment herein described by way of example, the two teeth 106, 108, while not intended to be limiting, are radially aligned. A length dimension 144 of the gap 118 is desirably at least forty percent of a diameter of the diametral magnet 122.

One simple way to make the rotor 120 is to use a single cylindrical piece of magnet material that is diametral magnetized. The rotor 120 may be made from one or more magnets, as long as it provides a north pole diametrically opposed from the south pole. For embodiments described herein by way of example, torque, inductance and resistance values are valid for a rotor magnet having a diameter of 0.12 inches and a length of 1.3 inches and made with high-grade Neodymium Iron Boron material, and the stator having an inside diameter of 0.136 inches.

The stator 102 illustrated with reference again to FIG. 13 comprises stator steel with each tooth 106, 108 providing a consistent separation 124 (an air gap) around the rotor magnet 122, which may have a smooth circular cross section or may include facets, by way of further example, without departing from the teachings of the present invention. The gap 118, herein described for the actuator 100 is relatively large when compared to known actuators (around 40% of the magnet diameter or greater) which would normally cause the rotor magnet 122 to experience a strong cogging toward the outside of a desired rotation range. The restoring means 132 herein presented includes restoring magnets 134, 136 inserted within slots 138, 140 in the teeth 110, 112 of the steel stator 102 for biasing the upper portion 146 of each tooth 106, 108 to be south, and the lower portion 148 of each tooth to be north, as herein described with reference again to FIG. 13. The north pole of the rotor magnet 122 is attracted evenly between the south pole of each restoring magnet 134, 136, and likewise the south pole of the rotor magnet is attracted evenly between the north pole of each restoring magnet. This overcomes the cogging action, and keeps the rotor magnet 122 oriented toward the center 141 of the range of rotation angles. It is noted that the line appearing to divide north and south poles is diagrammatical only and is not intended to limit the magnet to distinct pole separations.

The stator 102, illustrated in cross section in FIG. 13, comprises a cylindrical shape. It will be understood by those skilled in the art that alternate shapes may be employed such as the rectangular cross section shape of the actuator earlier described with reference to FIG. 9 without departing from the teachings of the present invention. Further, the stator 102 may be formed from laminations, as will be described later with reference again to FIG. 9.

Figure 14:
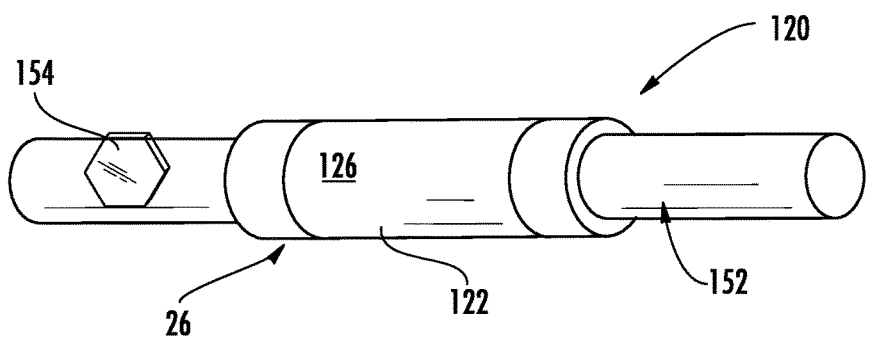
FIG. 14 is one embodiment of a rotor having a magnet and shaft operable with the embodiment of FIG. 1.

The rotor magnet 122 for the embodiment herein described by way of example comprises a Neodymium Iron Boron material. The rotor magnet 122 may be integrally formed with a shaft 152, wherein the shaft may carry an optical element 154 carried by the shaft, as illustrated with reference to FIG. 14. The optical elements may comprise a mirror, prism or filter effectively used in optical scanners. The shaft 152 may be made of stainless steel, although practically any material can be used as long as the material can withstand the torque produced by the actuators 10, 100 and any external load connected to the actuator within the environment being operated. As above described, the shaft 152 may be integrally formed with the rotor magnet 122 or may be attached to the magnet using adhesives such as epoxy.

Figure 15:
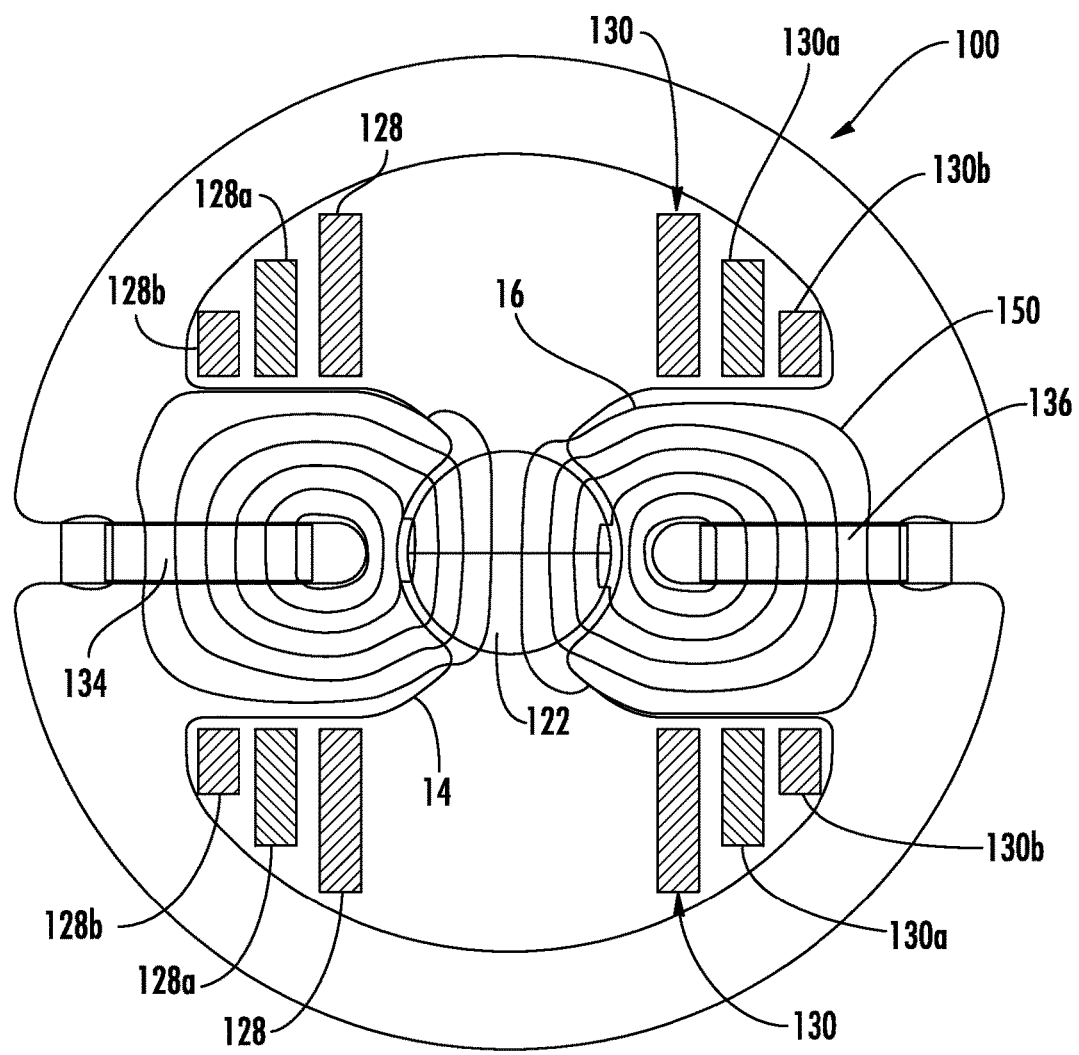
FIG. 15 illustrates the magnetic flux lines in the embodiment shown in FIG. 13.

By way of further example, FIG. 15 illustrates flux lines 150 between the rotor magnet 122 and the restoring magnets 134, 136. When electrical current is passed through the coils 128, 130, each tooth effectively becomes an electro magnet, which contributes torque and motion of the rotor magnet 122. For one actuator shown in FIG. 13, with 19 turns of AWG #25 magnet wire around each tooth, the Torque Constant (KT) is approximately 38,000 Dyne*Centimeters per amp, Coil Resistance (R) is 0.1 ohms, and Coil Inductance (L) is around 157 microhenries.

By way of further example, and with reference to the disclosure in related U.S. patent application Ser. No. 13/446,737 for Electromechanical Device and Assembly Method, the disclosure of which is herein incorporated by reference in its entirety, reference is now made to FIG. 16, wherein a magnetic circuit is created by the rotor magnet 122, and the stator 12. A magnetic flux 158 leaves the north pole of the magnet, jumps across a magnetic air gap 160, and reaches a top of the left tooth and top of right tooth. The magnetic flux 158 extends through the stator assembly in a direction of bottom of the left tooth and bottom of the right tooth, and eventually the flux portion jumps across the magnetic air gap and back to the south pole of the magnet.

Figure 16:
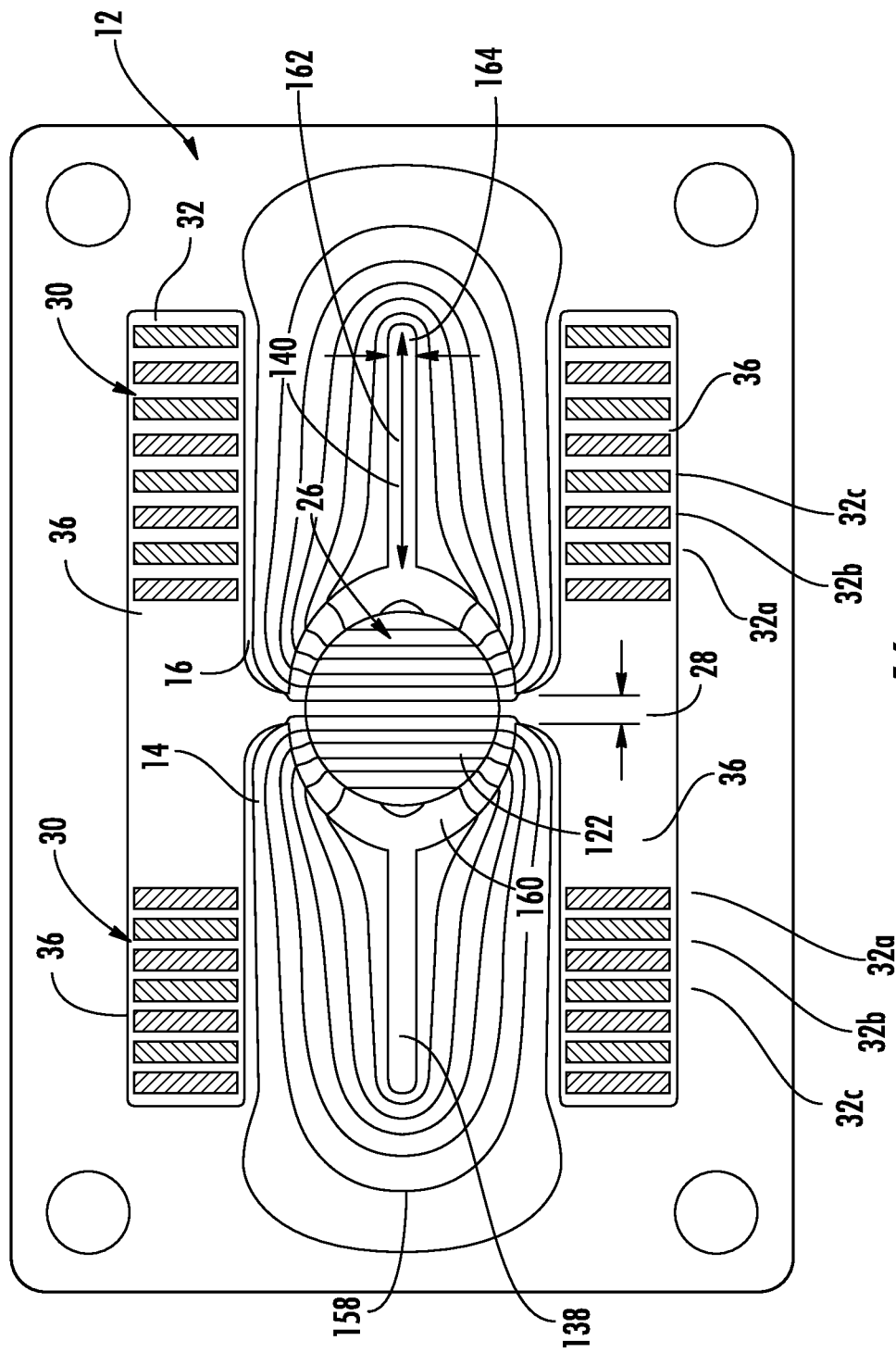
FIG. 16 diagrammatically illustrates one magnetic circuit in keeping with the teachings of the present invention.
Figure 16A:
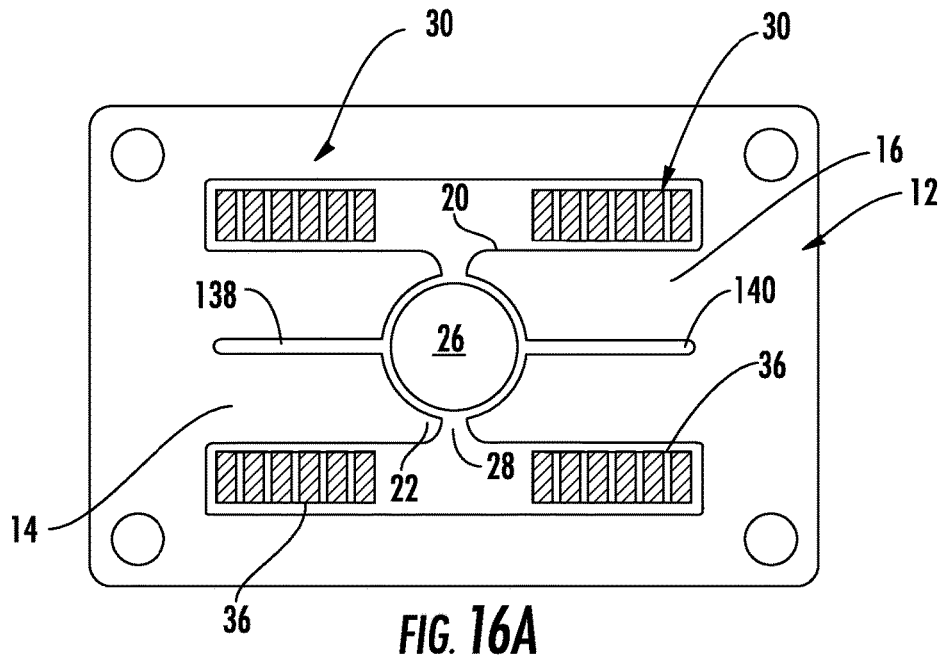
FIG. 16A illustrates a magnetic circuit whose air-gap is similar around the magnet.

With continued reference to FIGS. 16 and 16A, to create torque output from the actuator 10, the coils 32 of electrically conductive material may be placed around the left tooth 14 and the right tooth 16 together or only one tooth and an electrical current circulated through the coils effectively turning the respective tooth into an electromagnet. As herein presented by way of example, two teeth are described and coils are placed around each of the two teeth.

As herein presented according to the teachings of the present invention, the coils 32 comprise a segmented set 30 of coils 32a, 32b, 32c formed as coil 32. Although the coil 32 may be placed around only one tooth, placing the coils around each tooth 14, 16 desirably provides a higher torque output capability, and also provides more flexibility for the driving electronics as long as each coil wire is accessible by the driving electronics.

By way of example, when an electrical current is passed through the left coil 32 with such a polarity that the left top tooth portion and left bottom tooth portion become more north, a clockwise rotational torque results because the north pole of the magnet will be repelled by the top of the left tooth and the south pole of the magnet will be attracted to the bottom of left tooth, as detailed in patent application Ser. No. 13/446,737. When the electrical current is reversed, the direction of the torque is also reversed. Torque is produced in proportion to the amount of electrical current applied to the coils. A desirable feature includes the coils 32 bidirectionally excitable for magnetizing the teeth 14, 16 to provide bidirectional torque to the rotor 26.

Figure 17:
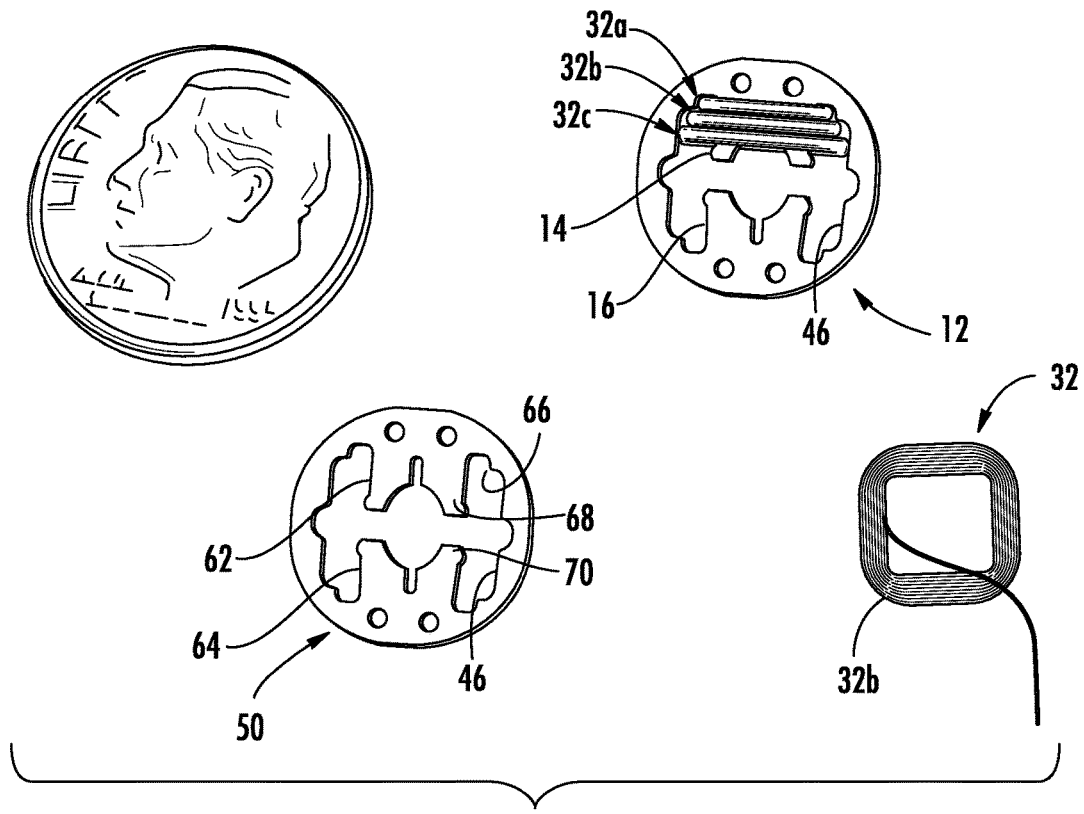
FIG. 17 is a perspective view of one embodiment of a stator illustrating the cylindrical stator and rectangular electrical coils for forming an actuator or motor according to the teachings of the present invention in relation to the size of a US dime.

As illustrated with reference now to FIGS. 17, 18 and 19, electrically insulating tabs 46 extend toward the coils to effectively insulate the coils from the stator body and teeth. The tabs 46 extend into an opening forming the coil area 36 around each tooth 14, 16. As earlier described with reference to FIG. 12, the coil area 36 carries the segmented set 30 of the coils 32. The tabs 46 maintain the coils 32a-32c collectively in a spaced relation 48 to the stator 12, the teeth 14, 16 and the inner wall surface 18.

Figure 18:
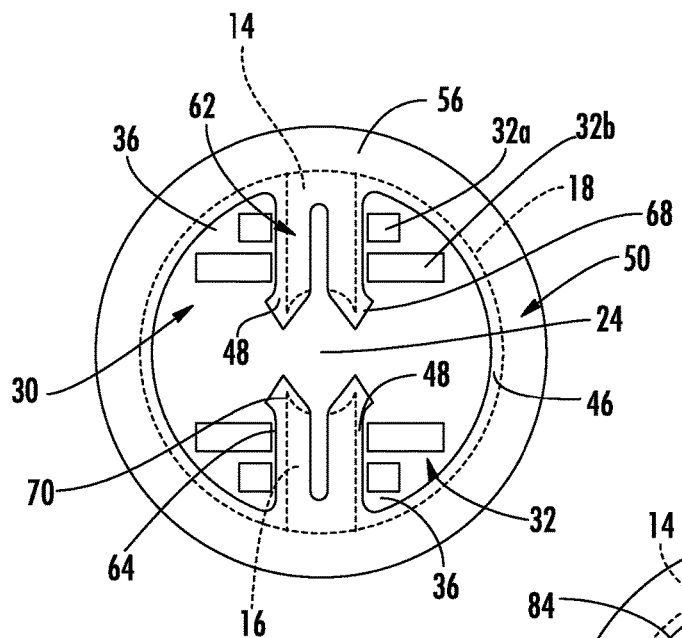
FIG. 18 is a cross sectional view taken radially through a midsection of a cylindrical stator according to the teachings of the present invention.
Figure 19:
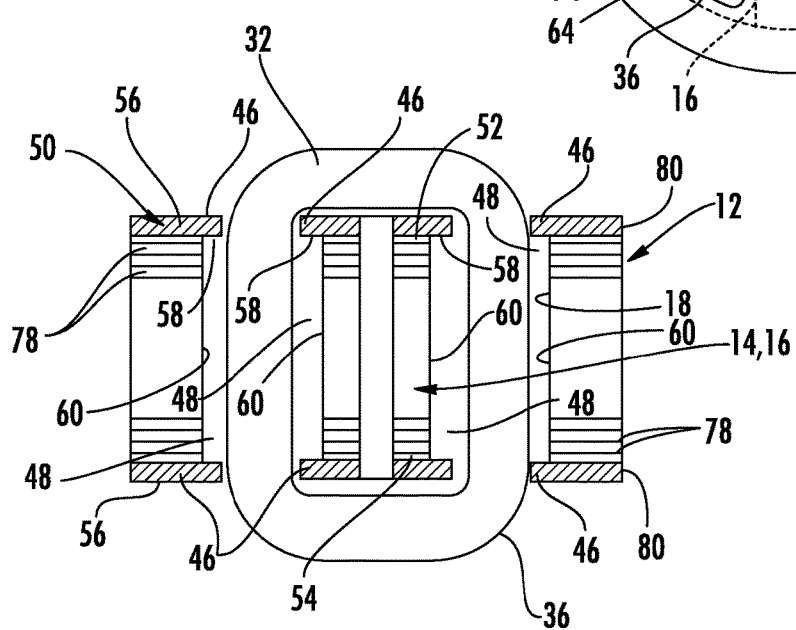
FIG. 19 is a cross sectional view of the cylindrical stator of FIG. 18 taken longitudinally therethrough.

With continued reference to FIGS. 18 and 19, the tabs 46 for one embodiment, herein presented by way of non-limiting example, are formed as part of a retainer 50 carried on top and bottom surfaces 52, 54 of the stator 12, a portion of which is herein illustrated. For the embodiment herein presented by way of example, the retainer 50 comprises a disk 56 having a cross section generally following a cross sectional shape of the stator 12 while providing an overlap 58 along interior an edge surface 60 thereof. It will be appreciated by those skilled in the art that the tab, herein illustrated as a continuous extended portion about a periphery of the disk may be a single tab or multiple discrete tabs as would be desired to accommodate the structure of the coils, stator body and teeth.

By way of further example, and with reference again to FIGS. 17 and 18, the retainer 50 may be described as including third and fourth teeth 62, 64 extending inwardly from an inner wall surface 66 of the retainer 50, wherein free ends 68, 70 of each retainer tooth 62, 64 contribute to form the aperture 24 dimensioned for receiving the rotor 26, earlier described. Further, the free end 68 of the third tooth 62 is in spaced relation to the free end 70 of the fourth tooth 64 to form a gap 72 therebetween, and wherein the spacing or gap 72 is sufficient for receiving the coil 32 therethrough.

Figure 1:
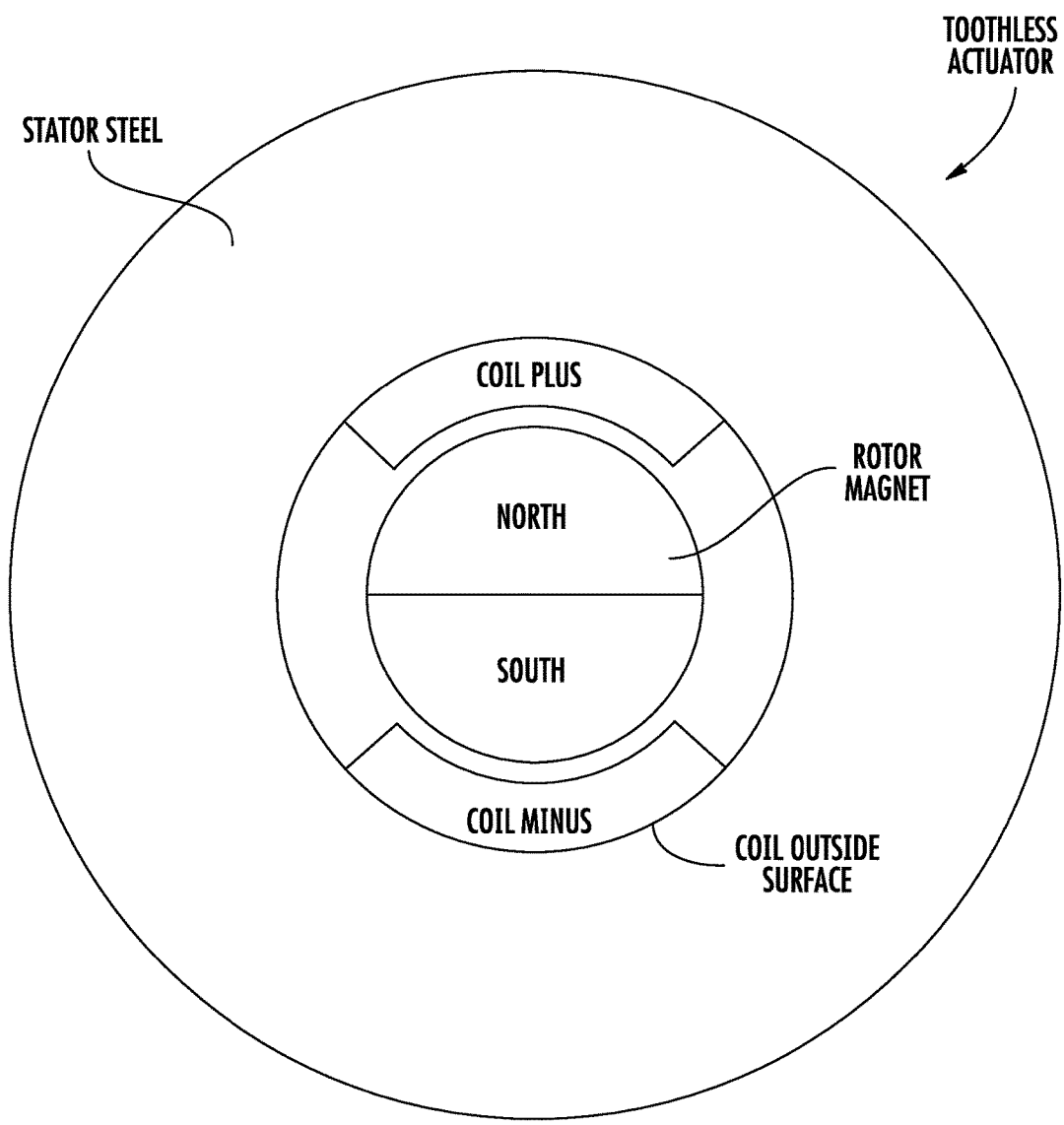
FIG. 1 illustrates a stator and rotor combination found in a toothless actuator of the current state of the art.
Figure 2:
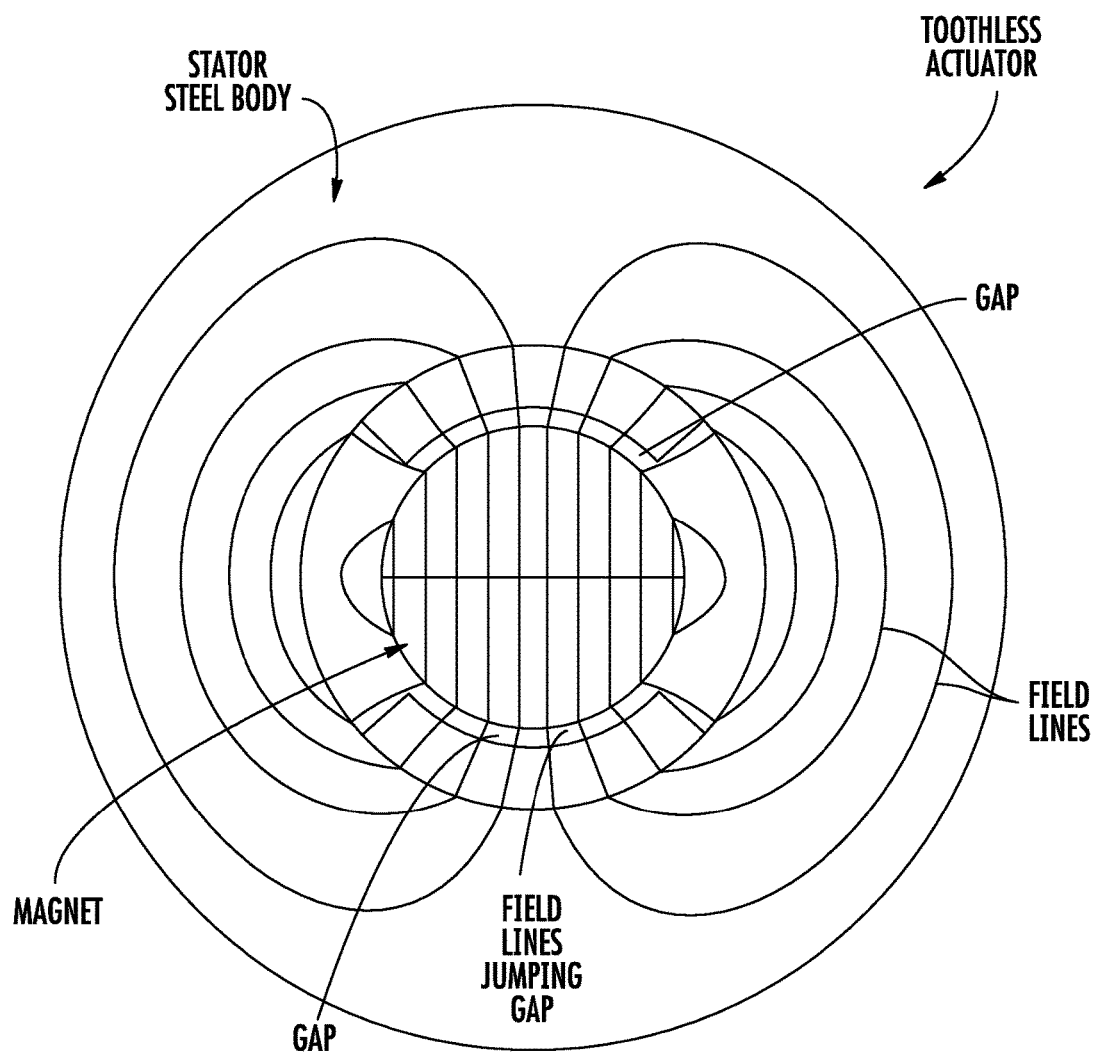
FIG. 2 illustrates the magnetic flux lines within a toothless stator and rotor combination of the current state of the art.
Figure 3:
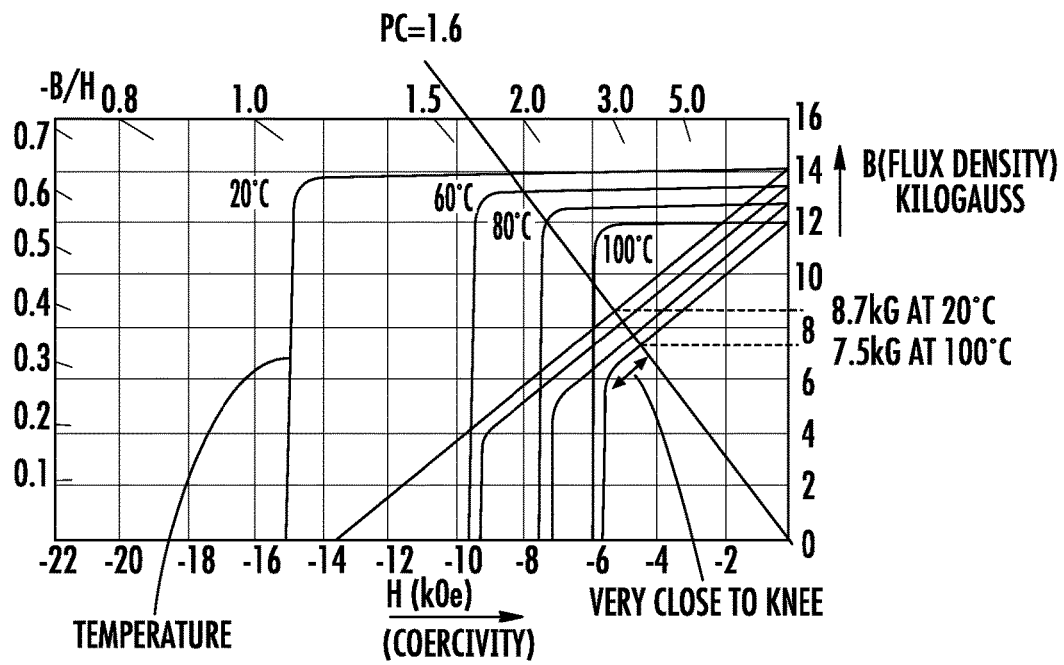
FIG. 3 illustrates the B/H curves and relevant information that pertains to the magnet used in a typical toothless optical scanner.
Figure 4:
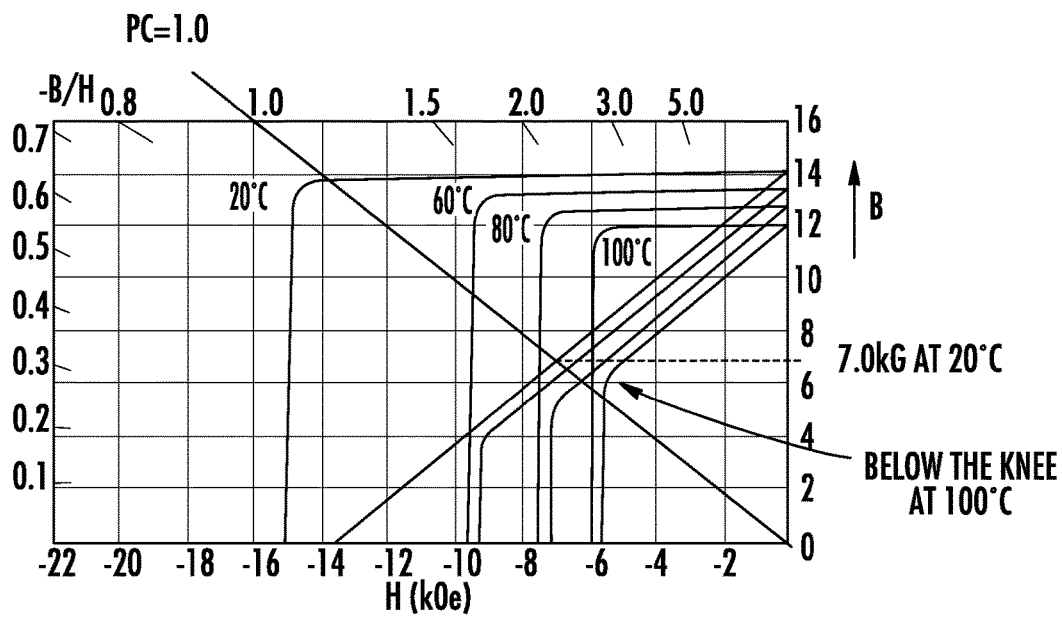
FIG. 4 illustrates the B/H curves and relevant information that pertains to a magnet used in a toothless scanner whose stator ID is increased.
Figure 5:
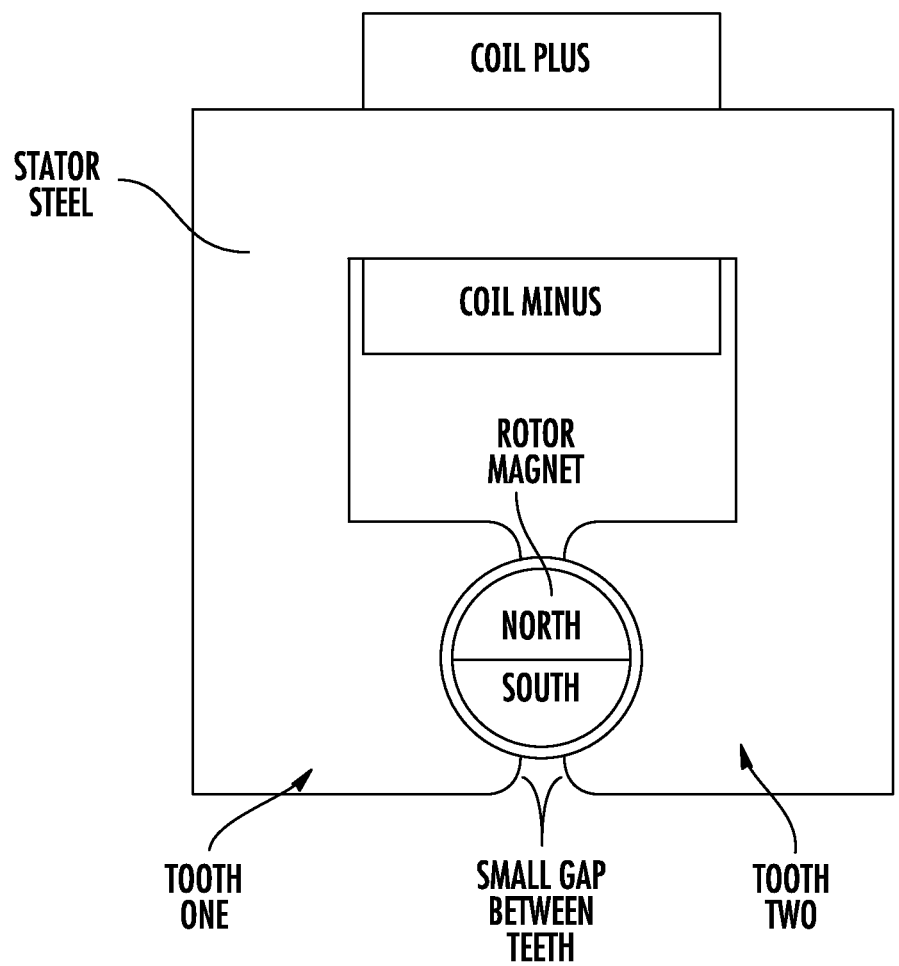
FIG. 5 illustrates the stator and rotor combination found in toothed actuators of the current state of the art.
Figure 6:
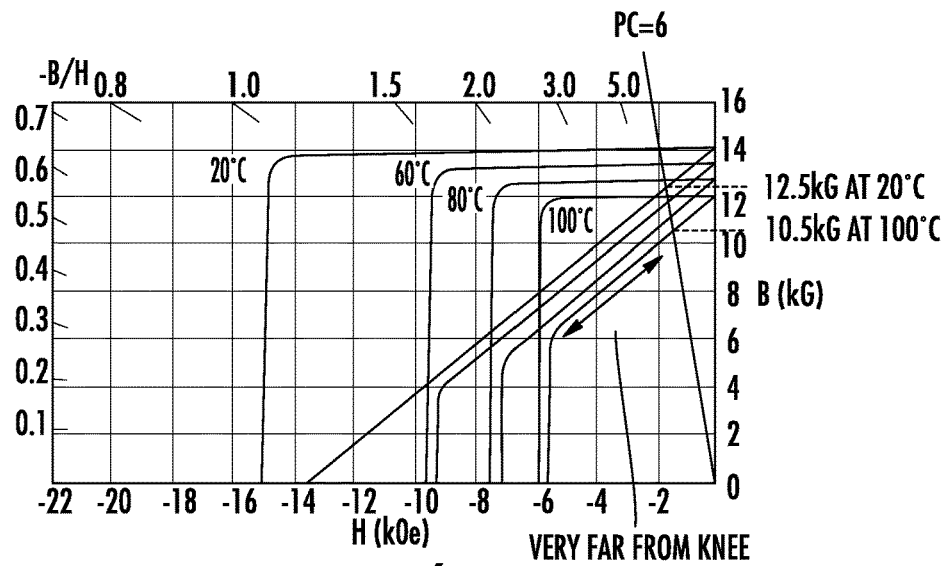
FIG. 6 illustrates the B/H curves and relevant information that pertains to the magnet used in a toothed actuator.
Figure 7:
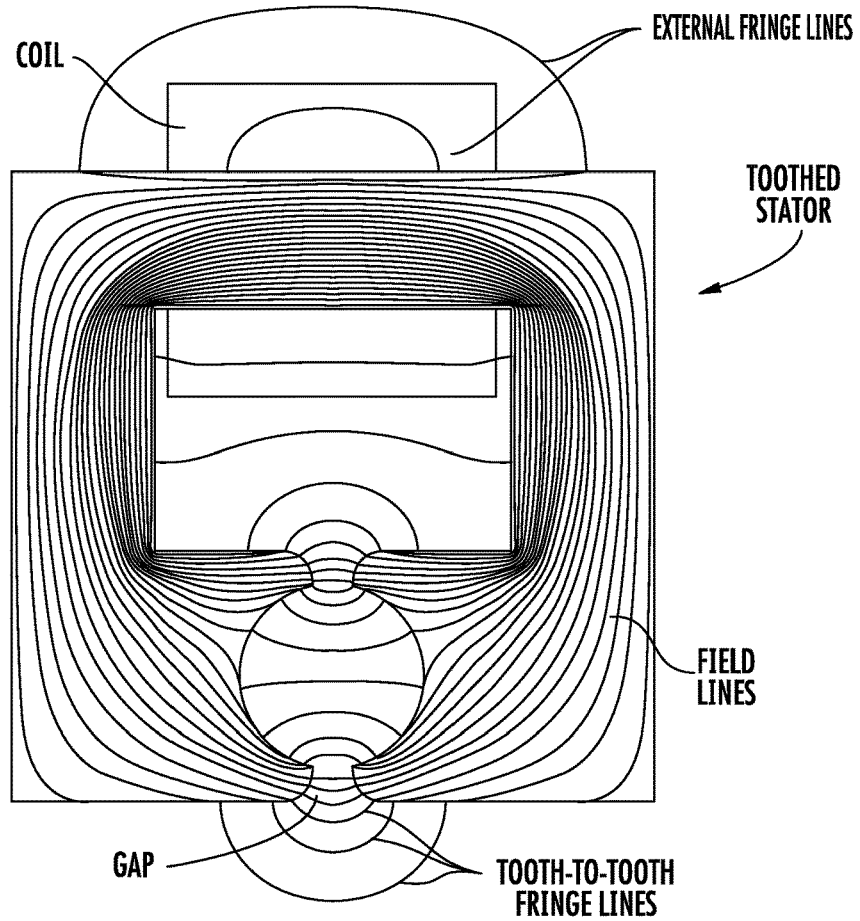
FIG. 7 illustrates the magnetic flux lines and fringe lines found within a toothed stator of the current state of the art.
Figure 8:
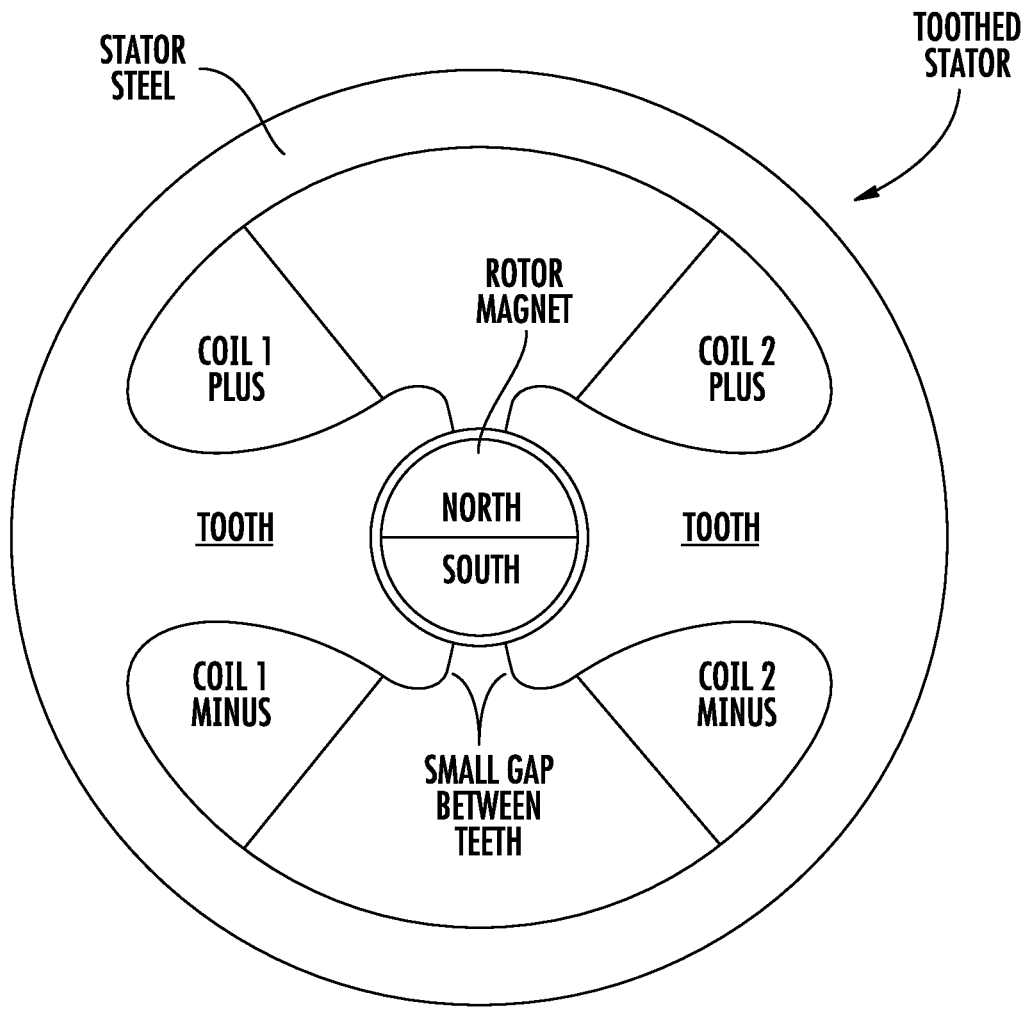
FIG. 8 illustrates the stator and rotor combination found in another toothed actuator of the current state of the art.
Figure 20:
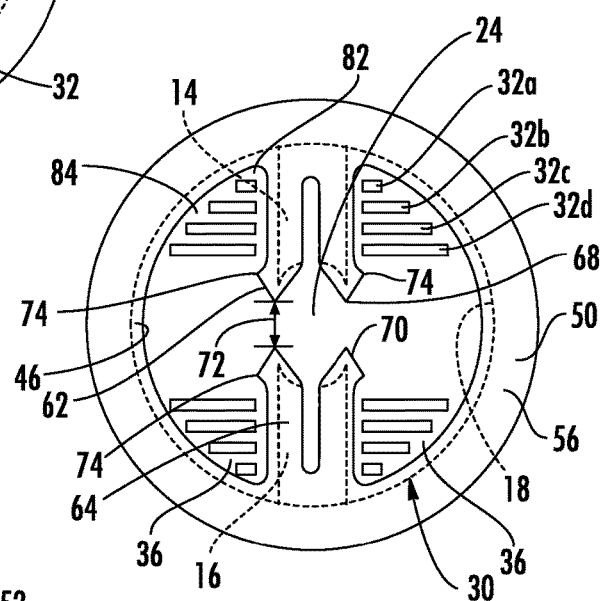
FIG. 20 is an alternate cross sectional view illustrating placement of an insulating retainer formed as a circular disk.

With continued reference to FIG. 18, the free ends 68, 70 of each of the third and fourth teeth 62, 64 may optionally include a protrusion 74 protruding therefrom for maintaining the segmented coil set 30 within the coil area 36, as desired. With continued reference to FIG. 18 and now to FIG. 20, the segmented set 30 of coils 32 herein described comprises at least two coils 32a, 32b, and each of the coils 32 was desirably formed outside the stator 12. As earlier described by way of example, one stator 12 may be rectangular as illustrated with reference again to FIG. 1 or have a cylindrical shape as illustrated with reference to FIGS. 13 and 17-20.

By way of continued example and with reference again to FIGS. 10 and 12, the end portions of the teeth together may form the aperture having a circular or oval shape, or the like.

With reference again to FIG. 9, the stator 12 may comprise multiple laminations 78, wherein top and bottom laminations 80 may include the electrically insulating retainer 50 having the tabs 46 above described.

As is well known in the art, fully packing the coils is desirable for improving efficiency of the actuator. The teachings of the present invention permit an optimum packing, and further, an optimal packing in a desirably economical manner. By way of example and with reference again to FIG. 20, one method may comprise forming the first coil 32a having the coil opening 38 for extending around each tooth 14, 16, wherein the first coil 32a has a first thickness 34a sufficient for passing through the gap 28 (or gap 72 when an insulating disk 56 is used), but its breadth 42 is dimensioned to fit within a relatively tight portion 82 of the coil area 36. The first coil 32a is passed through the gap 28 and positioned around the tooth 14. The second coil 32b having the appropriate opening 38 and thickness 34 to pass through the gap 72 between the teeth 14, 16 but may have a different width 44 and breadth 42, as long as its thickness 34 permits passage through the gap. The second coil 32b is passed through the gap 28 and positioned around the tooth next to the first coil 32a. As herein presented by way of example, the second coil may comprise a second breadth and width different from the first coil to better pack a wider portion 84 of the coil area 36. As will come to the minds of those skilled in the art, repeating the forming and passing steps for providing a segmented set of a variety of shapes for the electrical coils, each having the required thickness will allow for an optimum of the coil area. The segmented coils 32a-32d around a tooth may then be connected in series for providing an equivalent of a single coil wound around the tooth. By way of example with reference again to FIG. 13, the segmented coils 128, 128a and 128b may be connected in a series connection 129 from coil 128 to coil 128a to coil 128b providing terminal ends A and B for providing a voltage thereto. Similarly, the coils 130, 130a and 130b may be connected to also operate as a single coil. A parallel or alternate connection of coils may also be used without departing from the teachings of the present invention.

With reference again to FIGS. 16 and 16A, and as addressed in the above referenced patent applications, the disclosures of which are herein incorporated by reference, to reduce angular position hysteresis and improve angular position repeatability, and to force flux lines to travel an entire length of the tooth where the coils 30 are located, each lamination forming a tooth or each tooth 14, 16 incorporates a notch or slot 138, 140. The slot 138, 140 forces flux from the magnet 122 to completely circulate the entire length of the tooth. This also helps to keep the flux density within the teeth 14, 16 relatively constant as the rotational angle of the magnet 122 changes. Since the flux density within the teeth 14, 16 remains relatively the same throughout a range of rotation angles, the magnetic permeability of the lamination material also remains relatively the same and thus, the coil inductance also remains relatively the same throughout a range of rotation angles, as is desired.

It will be of interest to note that the inductance of an actuator changes depending upon a rotation angle of the magnet, and is referred to as inductance modulation. With typical actuators, the inductance indeed changes depending on angle. However, an electromechanical actuator whose inductance does not change very much depending upon the angle is highly desirable. The embodiments of the present invention herein described by way of example provide such a desirable performance.

As described in U.S. application Ser. No. 13/446,500 for an electromechanical limited rotation rotary actuator, the disclosure of which is herein incorporated by reference in its entirety, the laminations forming the stator may be made from a silicon-steel material known as M-19, a material specially made for motors and electrical transformers. However, many different materials will work, as long as the material is magnetically conductive. A few possible alternative materials include a cold-rolled steel (for example Q-195) and magnetic stainless steel (stainless steel 416 by way of example).

With continued reference to FIG. 16, by way of example, the slot 138, 140 may have a depth 162 into the tooth 14, 16 that is generally as deep as the coil 32 is wide, although other depths may be acceptable. The width 164 of the slot does not appear to be critical. However manufacturing techniques will generally dictate that the width is at least as wide as the lamination is thick. The width should generally be made no wider than a separation between free ends of the teeth. In an exemplary embodiment, the slot is 0.030 inches wide, and the separation 124 between teeth is 0.040 inches. Although these dimensions are for an exemplary embodiment, they are not intended to be limiting.

By way of further example with regard to performance, and with reference again to FIG. 12, the magnetic air-gap 118 may be made to be the same all the way around the magnet or may be wider on left and right portions, as illustrated with reference to the oval shape in FIG. 16. When the magnetic air-gap 118 is made to be the same around the magnet, and no current is applied to the coils, there will be a slight restoration torque placed on the magnet, tending to orient the north pole toward +45 degree, −45 degree, +135 degree and −135 degree angular positions. Thus, in this configuration there are four desirable angular positions when no current is applied to the coils. The magnet will orient itself in such a way to "prefer" four separate positions. Thus, there is a preference of the magnet. However, when the magnetic air-gap 118 is made wider on the left side and the right side of the magnet and no current is applied to the coils, there will be a strong restoration torque placed on the magnet, tending to orient the north pole toward +90 degrees (straight up in the orientation of the drawing) or −90 degrees (straight down in the orientation of the drawing) angular positions. Thus, in this configuration there are two strongly desirable angular positions when no current is applied to the coils. In keeping with the terminology as described above, the magnet will have a very strong preference for two separate angular positions. The strength of this restoration torque depends on how much wider the air-gap is on the left side and right side, when compared to the top and bottom sides. This strongly desirable angular position provides a spring-like return-to-center action (restoration torque) for the actuator, which is highly desirable.

Further, by using the cylindrical magnet that is diametral magnetized, a sinusoidal flux-versus-angle profile results. This in turn produces an approximately sinusoidal output-torque versus angle profile for the actuator when current is applied to the coils. Moreover, as discussed above, using a magnetic air-gap whose width continually increases from the top-bottom toward the left-right, an approximately sinusoidal spring-like return-to-center torque profile results. In this configuration, since the shape of the output-torque-versus-angle profile is the same as the spring-like restoration-torque versus angle (return-to-center) profile, the net result is that the output-angle versus input-current profile is nearly linear over an angle of around +/−60 mechanical degrees. The input current results from the input voltage driving both coils, herein connected in series, by way of non-limiting example. The actuators of the present invention have been shown to have a desirable range of over +/−80 mechanical degrees, with minor degradation in output-angle versus input-current linearity. The very wide angle capability and the very linear output-angle versus input-current profile are both unusual and highly desirable aspects of the present invention.

A return-to-center restoration torque that results either by using restoration magnets as illustrated with reference again to FIG. 13, or by using an oval aperture as illustrated with reference to FIG. 10 does indeed provide a "spring-like" action. This, coupled with the inertia of an external load creates a spring-mass system, which has a corresponding resonant frequency. When a pulse-type current is applied the actuator, this spring-mass system will overshoot and oscillate at the resonant frequency. Typically the oscillation may last for ten or more cycles, which is a typical characteristic of actuators with spring-return and inertial loads. To reduce the overshoot and oscillation, damping may be added.

Those of skill in the art will be reminded that while the actuators herein presented by way of example are toothed actuators, inductance is still desirably reduced. Inductance is reduced with a widened gap between the teeth. However, widening the gap undesirably increases cogging. As herein presented by way of example, the problems associated with cogging torque is solved by use of the restoring magnets, as illustrated with reference again to FIG. 13, or by using an oval aperture, as illustrated with reference again to FIG. 16.

Further, those of skill in the art will appreciate the extensive list of elements herein described, by way of example for electromechanical rotary actuators and the variables when combining features to satisfy problems in the art. Further, while the logic herein presented has been made clear, it will be appreciated that the combination of elements and features herein presented can only result from extensive experimentation and testing. Further, while a selected combination may be desirable for a selected use, the teachings of the present invention allow those of skill in the art to choose a combination that best fits their needs.

By way of example with regard to fabrication, stacking laminations as herein presented, applying top and bottom electrically insulating disks, and inserting pre-formed coils to fit though gaps between teeth, will be appreciated by those of skill in the art as being relatively easy to fabricate and desirably inexpensive.

Although a detailed description and drawings of the invention have been provided above, it is to be understood that the scope of the invention is not to be limited thereby, but is to be determined by the claims which follow. Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A limited rotation rotary actuator comprising:
a stator having first and second teeth extending inwardly from an inner wall surface thereof, wherein a free end of each tooth in combination forms an aperture dimensioned for receiving a rotor therein, and wherein the free end of the first tooth is in spaced relation to the free end of the second tooth to form a gap therebetween; and
a segmented set of electrical coils extending around a single tooth, the segmented set of electrical coils comprising at least two individual electrical coils, wherein the single tooth comprises at least one of the first tooth and the second tooth, wherein each coil of the segmented set has a thickness sufficient for passing through the gap between the first and second teeth, and wherein the segmented set of coils functions as a single coil resulting from electrical connections therebetween.

2. The actuator according to claim 1, further comprising electrically insulating tabs extending into an opening around each tooth, wherein the opening carries the segmented set of coils therein, and wherein guards maintain each of the coils within the segmented set in a spaced relation to surfaces of the stator.

3. The actuator according to claim 2, wherein the tabs extend from a retainer carried by the teeth.

4. The actuator according to claim 3, wherein the retainer comprises a disk having a cross section generally following a cross sectional shape of the stator while providing an overlap along edges thereof.

5. The actuator according to claim 4, wherein the retainer comprises third and fourth teeth extending inwardly from an inner wall surface thereof, wherein free ends of each of the third and fourth teeth form an aperture dimensioned for receiving the rotor therein, wherein the free end of the third tooth is in spaced relation to the free end of the fourth tooth to form a separation therebetween, and wherein the separation is sufficient for receiving the coil thickness therethrough.

6. The actuator according to claim 5, wherein free ends of each of the third and fourth teeth comprise a protrusion protruding therefrom for maintaining the segmented coil set within a desired coil area of the stator.

7. The actuator according to claim 1, wherein the segmented set of coils comprises at least two coils, and wherein each of the two coils was formed outside the stator.

8. The actuator according to claim 1, wherein the stator comprises a cylindrical shape, and wherein the first and second teeth extend radially inward.

9. The actuator according to claim 1, wherein end portions of the teeth together form the aperture having at least one of a circular and oval cross section.

10. The actuator according to claim 1, wherein the stator comprises multiple laminations, and wherein at least one lamination includes an electrically insulating tab.

11. The actuator according to claim 1, further comprising a rotor extending into the aperture and a magnet carried by the rotor, wherein the aperture comprises an oval cross-section for receiving the magnet therein, and wherein a separation between the free ends of the teeth and the magnet varies about a periphery of the magnet.

12. The actuator according to claim 1, wherein each of the first and second teeth includes a slot extending longitudinally therein.

13. The actuator according to claim 12, wherein the slot is open ended at the free ends of each tooth.

14. The actuator according to claim 12, further comprising a restoring magnet carried within each slot.

15. The actuator according to claim 1, further comprising a rotor extending into the aperture and a magnet carried by the rotor, wherein the aperture comprises a circular cross-section for receiving the magnet therein, and wherein a separation between the free ends of the teeth and the magnet is constant about a periphery of the magnet.

16. A method of fabricating a limited rotation rotary actuator, the method comprising:
providing a stator having first and second teeth extending inwardly from an inner wall surface thereof, wherein a free end of each tooth forms an aperture dimensioned for receiving a rotor therein, and wherein the free end the first tooth is in spaced relation to the free end of the second tooth for forming a gap therebetween;
forming a first coil having a first opening therein for extending around the first tooth, wherein the coil has a first thickness sufficient for passing through the gap;
passing the first coil through the gap and positioning the first coil around the first tooth;
forming a second coil having a second opening therein for extending around the first tooth, wherein the second coil has a second thickness sufficient for passing through the gap; and
passing the second coil through the gap and positioning the second coil around the first tooth.

17. The method according to claim 16, further comprising repeating the forming and passing steps for providing a segmented set of electrical coils around the first tooth.

18. The method according to claim 17, further comprising extending electrically insulating tabs into an opening around the first tooth for maintaining each of the coils within the segmented set in a spaced relation to the stator.

19. The method according to claim 18, wherein the tabs extending step is completed prior to the coil passing steps.

20. The method according to claim 19, wherein the stator providing step comprises forming the stator by stacking multiple laminations.

21. The method according to claim 20, further comprising forming at least one lamination as an electrically insulating layer having the tabs extending into an opening around each tooth for maintaining each coil within the segmented set of coils in a spaced relation to the stator.

22. The method according to claim 16, further comprising connecting the coils extending around the first tooth in series for providing an equivalent of a single coil wound around the first tooth.

23. The method according to claim 16, wherein the first opening is dimensioned as the second opening.

24. The method according to claim 16, wherein the first thickness is dimensioned as the second thickness.

25. The method according to claim 16, wherein the stator providing step includes providing at least one tooth having a slot extending longitudinally therethrough.

26. The method according to claim 25, further comprising placing a restoring magnet in the slot.

27. The method according to claim 16, wherein the stator providing step comprises providing a free end of each tooth forming an aperture having an oval cross section.

* * * * *